United States Patent [19] [11] 3,914,589
Gaskill, Jr. et al. [45] Oct. 21, 1975

[54] FOUR-BY-FOUR BIT MULTIPLIER MODULE HAVING THREE STAGES OF LOGIC CELLS

[75] Inventors: James R. Gaskill, Jr., Pacific Palisades; Lawrence R. Weill, Seal Beach, both of Calif.

[73] Assignee: Hughes Aircraft Company, Culver City, Calif.

[22] Filed: May 13, 1974

[21] Appl. No.: 469,131

[52] U.S. Cl. .......... 235/164
[51] Int. Cl.[2] .......... G06F 7/52
[58] Field of Search .......... 235/164, 175

[56] References Cited

UNITED STATES PATENTS

| | | | |
|---|---|---|---|
| 3,524,977 | 8/1970 | Wang | 235/164 |
| 3,670,956 | 6/1972 | Calhoun | 235/164 |
| 3,752,971 | 8/1973 | Calhoun | 235/164 |
| 3,795,880 | 3/1974 | Singh et al. | 235/164 |

*Primary Examiner*—David H. Malzahn
*Attorney, Agent, or Firm*—John M. May; W. H. MacAllister

[57] ABSTRACT

This invention is a logic design defining the interconnection of logic cells such as those Universal Logic Gates to implement either a 1's complement (all positive) or a 2's complement 4 × 4-bit binary multiplier. This multiplier generates the binary product of any two 4-bit binary numbers such that the input signals propagate serially through at most only three logic gating (cell) stages.

An extension of the multiplier's basic logic partition scheme permits design of larger multipliers in which adders and 4 × 4-bit multipliers are used as building blocks. A detailed 8 × 8-bit multiplier design is presented to concretely describe the approach.

The "2's-complement" 4 × 4-bit multiplier's logic partition is almost identical to the one used in the (all positive) 4 × 4-bit multiplier design, incorporating subfunctions which are nearly all identical to their counterparts in the (all positive) multiplier.

5 Claims, 15 Drawing Figures

Fig. 3.
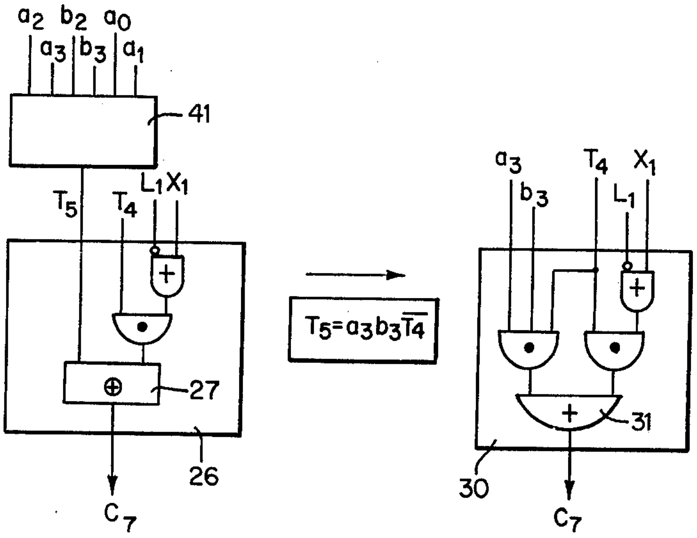
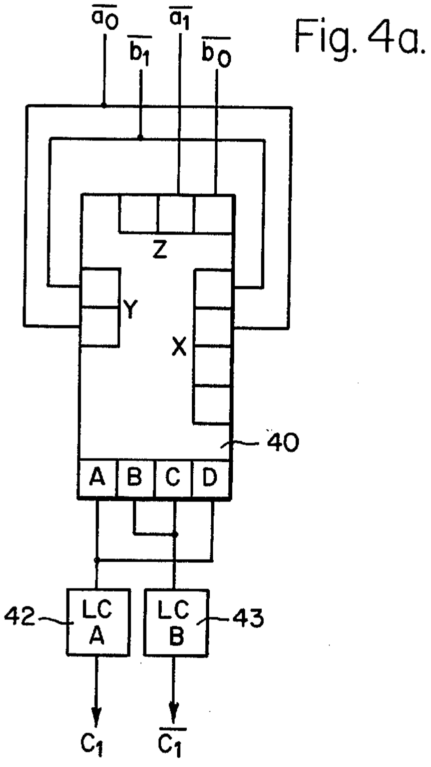
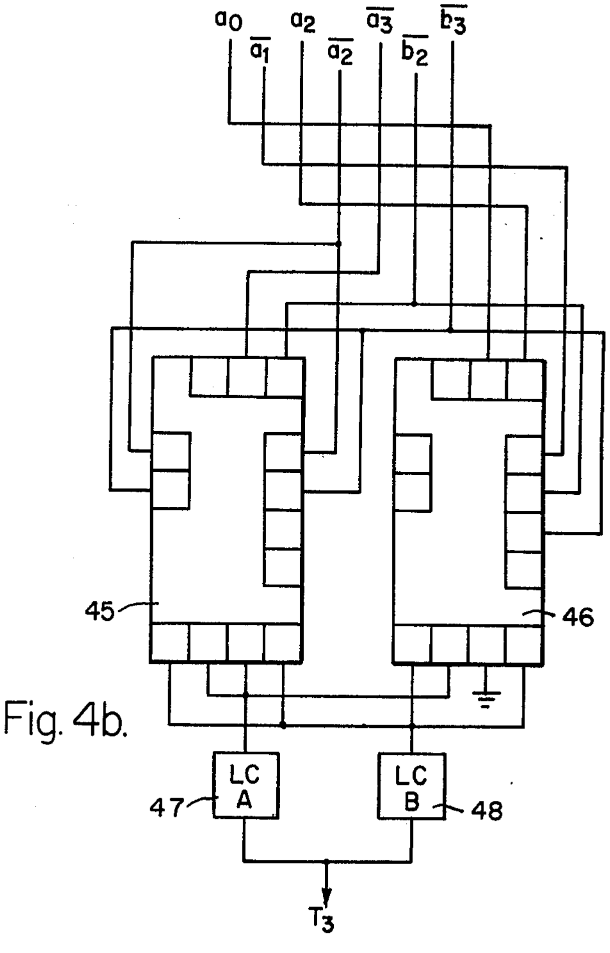

FOUR-BY-FOUR BIT MULTIPLIER MODULE HAVING THREE STAGES OF LOGIC CELLS

BACKGROUND OF THE INVENTION

PRIOR ART

Multiplier logic designs implemented to date fall into 2 categories: (1) multipliers constructed using arrays of commercially fabricated MSI integrated circuits, and (2) special experimental multipliers built using new integrated circuit cells (sometimes as LSI/sometimes as hybrids). One such prior art multiplier from each category is described below.

Multiplier built using commercial MSI

The Motorola ALU (MC-10181) is frequently used as a building block for multipliers. A 4 × 4-bit multiplier can be realized using 3 MC-10181 ICs plus some additional gating. The propagation delay and power dissipation for this multiplier would depend on how the array was built. To compare it fairly with LSI, it is assumed that Motorola chips are assembled in a hybrid package (reducing cable delay between parts and reducing termination power dissipation). In this case the multiplier delay would range between about 24 and 32 nanoseconds and its power dissipation would vary between 2.8 and 3.5 watts.

By way of contrast, the 4 × 4-bit multiplier design described in this application would subtend between 7 and 8 nanoseconds delay and consume about 3 watts if its cascode cell circuitry were fabricated on a similar production line.

LSI 4 × 4-Bit Multiplier

Special multiplier arrays built using special cells and LSI or hybrid connected can also be contrasted with the design disclosed here. One such multiplier was developed under Air Force Contract F 33615-71-C-1467 and desribed in "High Speed Digital filters", D.R. Breuer et al, Interim Technical Report, July 1972, pp. 36–53. This multiplier is constructed (100% yield) in LSI. It is built by interconnecting 16 identical cells, each of which contains 2, 3-level, specially tailored cascode circuits. That report discloses both the multiplier logic design, and schematic diagram for each identical call. Even though this multiplier uses a (logically) more poserful 3-level cascode cell which is moreover custom designed for use in just this multiplier circuit, it subtends a nominal 28 ns delay. This is because its logic design requires signal path propagation through a seven stage delay cell interconnection. The circuit dissipates about 1 watt' its relatively small (good) power delay product is achieved because the cell array has apparently been fabricated in a very high quality IC line.

OBJECTS OF THE INVENTION

In many digital computers and in digital radar signal processors, higher speed arithmetic components such as multipliers, adders, and the like, can be used to reduce the hardware cost of the system and/or to improve system performance. This is the case because higher speed components can be operated at a higher data rate (words or operations per second) and therefore fewer high speed components can be used to replace several of their conventional counterparts. In signal processors, multipliers are particularly important. They are used in fairly large numbers in the range focusing, amplitude weighting, pulse compression, and particularly, in the filter processor sections of such radar signal processors.

Accordingly, it is a first object of the present invention to provide a 4 × 4-bit binary multiplier module having a higher speed than that available from prior art components.

It is a second object of the present invention to provide a multiplier module capable of expansion into larger multipliers.

It is a third object of the present invention to provide a multiplier logic design which simplifies implementation of the multiplier using universal logic blocks.

It is a fourth object of the present invention to provide a 4 × 4-bit binary multiplier requiring the input signal to propagate serially through at most only 3 logic gating stages.

A specific object of the present invention is to provide for a multiplier logic design capable of implementation using the logic building blocks of a type known as "Modular Unit Delay Universal Logic Gates".

CROSS REFERENCE TO RELATED APPLICATIONS

The application of J. R. Gaskill, Jr., and B. C. Devendorf, entitled "Universal Logic Gate", Ser. No. 450,114, filed on Mar. 11, 1974 and assigned to the same assignee as the present application, describes modular unit delay universal logic blocks which may be used in a preferred embodiment of the present invention and is incorporated by reference hereby in its entirety.

BRIEF DESCRIPTION OF THE FIGURES

FIG. 3 illustrates a logic simplification of a particular multiplier output function.

FIG. 4, comprising FIGS. 4*a* and 4*b* illustrates the synthesis of typical multiplier functions as specified in FIG. 2 using the universal logic gates of the above referenced co-pending application.

SUMMARY OF THE INVENTION

Figure 1:
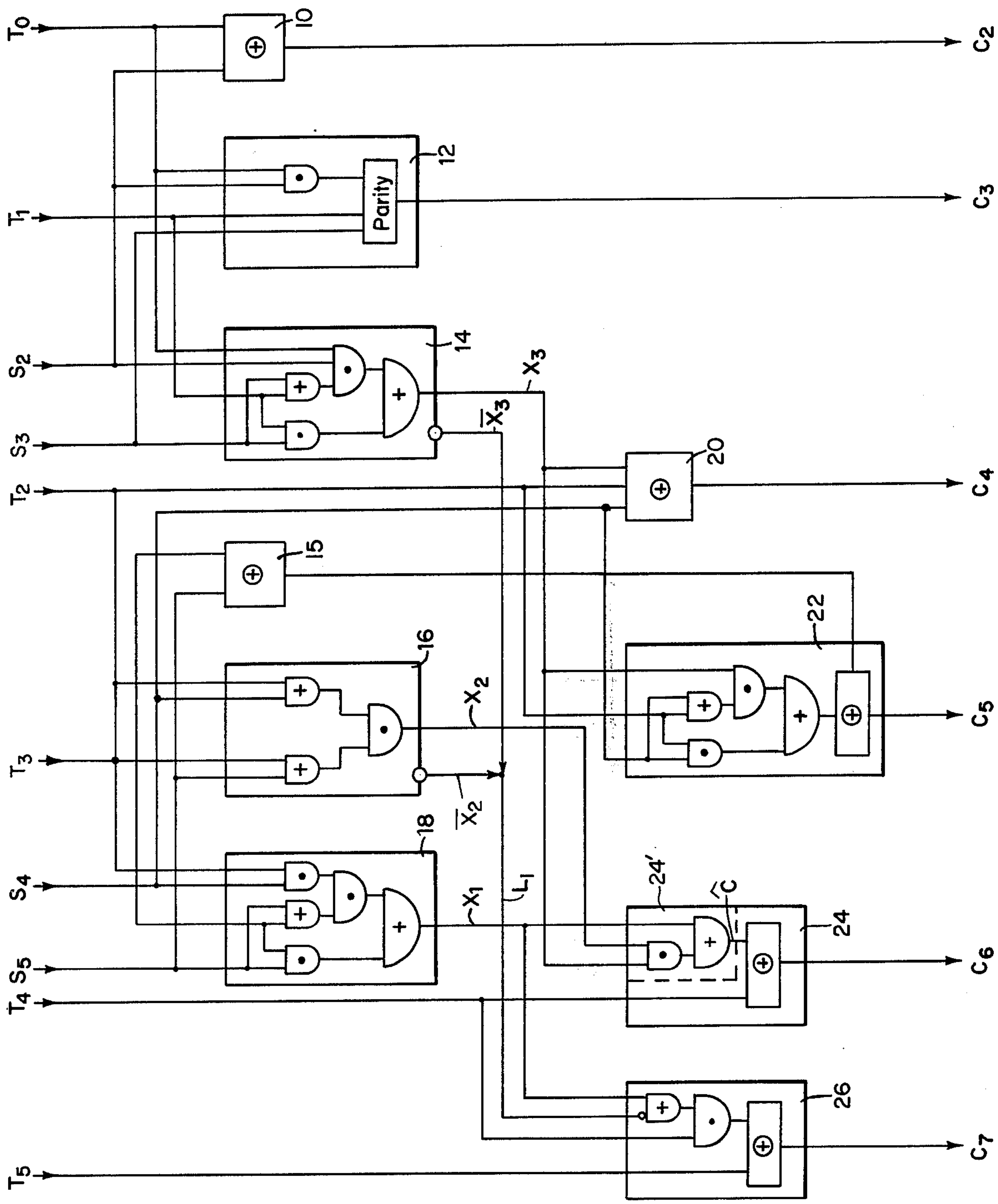
FIG. 1 illustrates the logic design for a preferred embodiment of the 6 × 4-bit adder required to implement an (all positive) 4 × 4-bit multiplier of the present invention.

Briefly, the present invention is directed to a 4 × 4-bit multiplier module wherein the signals are required to propagate serially through at most only three logic gating stages. A special 6 by 4 bit adder is responsive to signals representative of selected digits of partial products S and T and generates intermediate variables at a first stage and then at the second stage forms from these intermediate variables the three most significant output digits.

The multiplier module of the present invention referred to briefly above and described in greater detail below permits the performance of binary multiplication operations at between 2 and 3 times faster and with smaller attendant multiplier hardware costs than any other comparable multipliers available, depending on the type of integrated circuit processing used.

If the circuits were to be fabricated (processed) using an up-to-date, high performance IC processing technique, the multiplier would probably have between 7 and 8 nanoseconds delay and the power dissipation of the circuit would be about 3.2 watts. Therefore, a multiplication rate of greater than 100 megawords per second would be possible.

These performance figures contrast favorably with those of the other comparable multipliers described above.

DETAILED DESCRIPTION OF THE INVENTION

The "Universal Logic Gate" (ULG) patent application referenced above describes the cascode circuit (cell) and the way that cascode cells can be "parallel" interconnected to implement any 4-input logic function, thereby constituting a modular ULG family. Accordingly, given the availability of unit delay ULGs, the multiplier logic design of the present invention may specify a 3-stage network of small logic blocks and the logic function to be performed by each is based on Boolean algebra and the numerical properties of binary multiplication. The logic design thus derived is then refined and "tailored" to make fuller use of cascode cell logic synthesis capabilities. (The cells can frequently mechanize functions of more than four input variables while subject to the same interconnection restrictions as in 4-input ULG synthesis, thereby implementing the larger functions in the same one stage ULG delay.)

Development of Logic Partitions for a 3-Stage 4 × 4-bit Binary Multiplier

The foundation of the 4 × 4-bit multiplier logic design is the decomposition of its 4 × 4-bit multiplication operation into two 2 × 4-bit multiplications. The products formed in these "component" multiplications feed a 6 × 4-bit adder whose output sum array comprises the 6 most significant multiplier output bits.

The multiplier binary inputs (with each $a_n = 0$ or $a_n = 1$ and $b_n = 0$ or $b_n = 1$) are expressed as $$N_1 = a_3 2^3 + a_2 2^2 + a_1 2^1 + a_0 2^0$$

and $$N_2 = b_3 2^3 + b_2 2^2 + b_1 2^1 + b_0 2^0 .$$

Their product $N_1 \, . \, N_2 = N_3$ defined by $$N_3 = (a_3 2^3 + a_2 2^2 + a_1 2^1 + a_0) \, . \, (b_3 2^3 + b_2 2^2 + b_1 2^1 + b_0)$$

may be written as $$N_3 = (a_3 2^3 + a_2 2^2 + a_1 2^1 + a_0) \, . \, (b_3 2^3 + b_2 2^2) + (a_3 2^3 + a_2 2^2 + a_1 2^1 + a_0) \, . \, (b_1 2^1 + b_0)$$

or $$N_3 = 2^2 \, [(a_3 2^3 + a_2 2^2 + a_1 2^1 + a_0) \, . \, (b_3 2^1 + b_2)] + (a_3 2^3 + a_2 2^2 + a_1 2^1 + a_0) \, . \, (b_1 2^1 + b_0) \, .$$

In the last equation, the product, $N_3$, is expressed as the sum of the products formed in two "component" 2 × 4-bit multiplications in which the first 2 × 4-bit product is "weighted" by $2^2$ before it is added to the second.

Binary expansions for each of the 2 × 4-bit products are $$T = T_5 2^5 + T_4 2^4 + T_3 2^3 + T_2 2^2 + T_1 2^1 + T_0 2^0$$

and $$S = S_5 2^5 + S_4 2^4 + S_3 2^3 + S_2 2^2 + S_1 2^1 + S_0 2^0$$

so that $N_3 = N_1 \, . \, N_2$ is expressable as $$N_3 = 2^2 T + S$$

or $$N_3 = 2^2 \, (T_5 2^5 + T_4 2^4 + T_3 2^3 + T_2 2^2 + T_1 2^1 + T_0) + (S_5 2^5 + S_4 2^4 + S_3 2^3 + S_2 2^2 + S_1 2^1 + S_0).$$

A graphical delineation of operations performed when the 4 × 4-bit multiplication implements this latter expression is as follows:

| $(2^7)$ | $(2^6)$ | $(2^5)$ | $(2^4)$ | $(2^3)$ | $(2^2)$ | $(2^1)$ | $(2^0)$ | |
|---|---|---|---|---|---|---|---|---|
| | | $S_5$ | $S_4$ | $S_3$ | $S_2$ | $S_1$ | $S_0$ | (S) |
| $+T_5$ | $T_4$ | $T_3$ | $T_2$ | $T_1$ | $T_0$ | | | $(2^2 . T)$ |
| $C_7$ | $C_6$ | $C_5$ | $C_4$ | $C_3$ | $C_2$ | $C_1$ | $C_0$ | $(N_3)$ |

where the $C_i$ are the coefficients in the binary expansion of the product $N_3 = N_1 \, . \, N_2$. It is also to be noted that the $T$'s coefficient array is shifted two places to the left relative to the S array since $T$ is multiplied by $2^2$.

It is also noted that the summation $S + 2^2T$ cannot require a "carry-propagation" beyond the $2^7$ place, because the product of two 4-bit numbers requires only an 8-bit binary expansion.

The graphical presentation above schematically delineates a logic partition for a 3-stage 4 × 4-bit binary multiplier synthesis which serves as a starting point in its design. In that partition, two parallel one-stage logic block arrays synthesize the coefficients in $S$ and in $T$. The $S_0$ and $S_1$ $S$-coefficients are the coefficients $C_0$ and $C_1$ in the expansion for $N_3 = N_1 \, . \, N_2$ and are therefore output from the multiplier, "as they are" at the S-array logic block outputs.

The remaining $S$-coefficients and all of the $T$-coefficients are fed to a two stage array which implements a 6 × 4-bit addition in a modified version of a 4-bit Adder as shown in FIG. 1. In that and subsequent FIGS., the following symbols are used to represent the designated gates:

| SYMBOL | GATE |
|---|---|
| 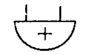 | "OR" GATE |
| 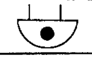 | "AND" GATE |

-Continued

| SYMBOL | GATE |
|---|---|
| 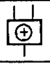 | "EXCLUSIVE -OR" GATE |
|  | INVERTED OUTPUT |
|  | WIRED "OR" |

Functionally the 6 × 4-bit adder first implements a conventional 4 × 4-bit addition of the numbers $$\hat{S} = S_5 2^3 + S_4 2^2 + S_3 2^1 + S_2 2^0$$

and $$\hat{T} + T_3 2^3 + T_2 2^2 + T_1 2^1 + T_0 2^0$$

forming a sum $$\hat{U} = \hat{C} 2^4 + C_5 2^3 + C_4 2^2 + C_3 2^1 + C_2 2^0.$$

This is performed in blocks 10, 12, 14, 15, 16, 18, 20, 22, and that portion of block 24 indicated by the reference numeral 24'. Although conventional symbology has been used, it should be noted that $X_1$, the output from block 18, is:

$$(S_5).(T_3) + (S_5 + T_3).(S_4).(T_2) = X_1$$

that $X_2$ (from block 16) is:

$$(S_5 + T_3).(S_4 + T_2) = X_2$$

while $X_3$ (from block 14) is:

$$(S_3).(T_1) + (S_3 + T_1).(S_2).(T_0) = X_3$$

Furthermore, it should be noted that $\underline{L_1}$ is formed by means of a wired "OR" from $\overline{X}_2$ and $\overline{X}_3$. The output $\hat{C}$ from portion 24' of block 24 is given by:

$$\hat{C} = X_1 + X_2 . X_3$$

The formation of digit $C_5$ within block 22 may be written symbolically as:

$$C_5 = S_4 . T_2 + (S_4 + T_2) . X_3 .$$

The $\hat{U}$ coefficients $C_5$, $C_4$, $C_3$, $C_2$ are the 3rd through 6th multiplier output bits. The remaining operation performed in the 6 × 4-bit adder is equivalent to that of adding the number $\hat{C}2^0$ produced in the first addition to the number $t = T_5 2^1 + T_4 2^0$ defined by the remaining T coefficients input to the adder. The sum $t + \hat{C}2^0$ encodes the last two of the 4 × 4-bit multiplier outputs. Thus, only two stages are required, as would be true of a 4 × 4-bit adder.

The logic functions which generate the 2 × 4-bit multiplications are specified in Table 1.

Figure 2A:
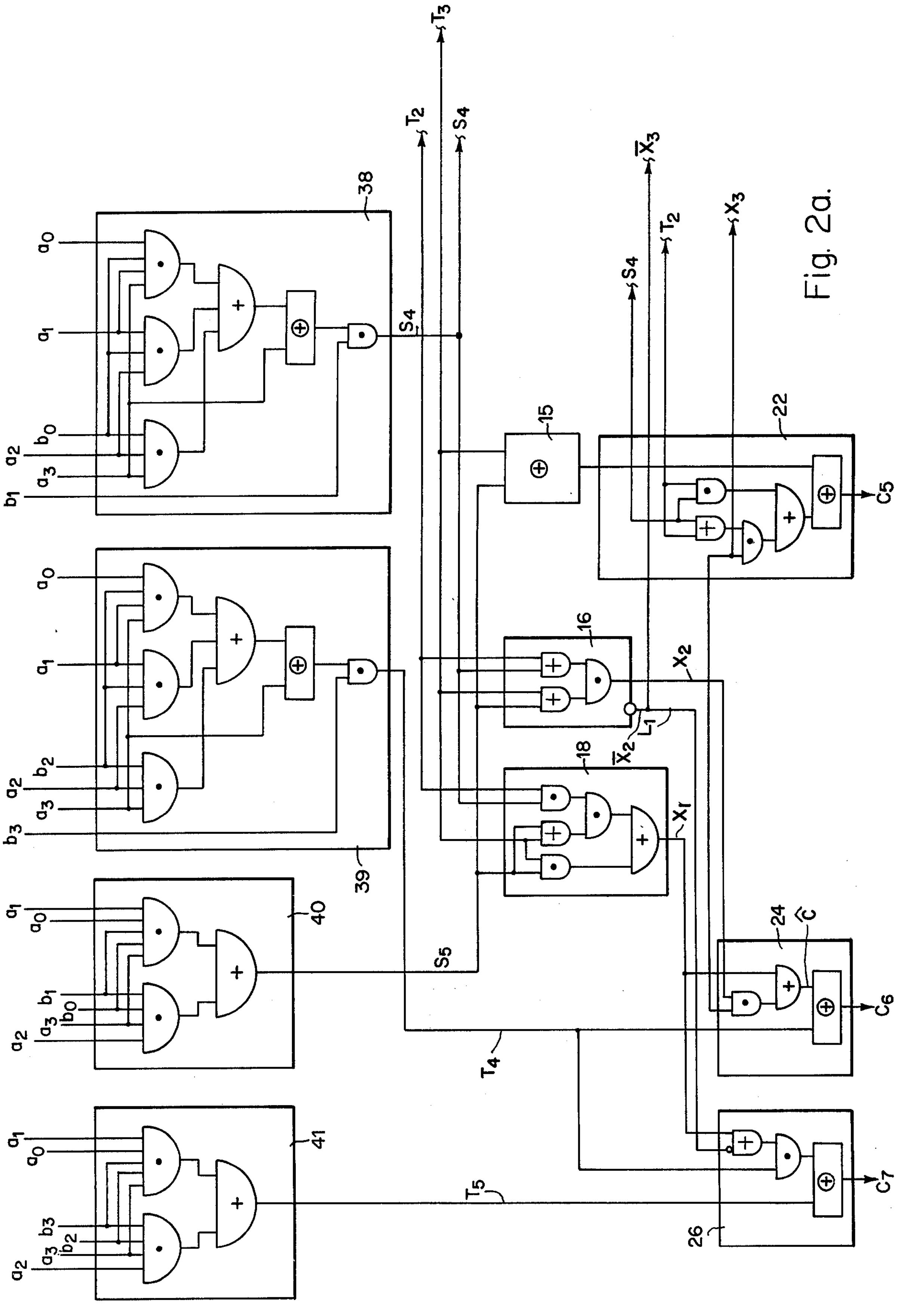
FIG. 2 (comprising FIGS. 2*a* and 2*b* assembled as indicated) illustrates the logic synthesis used to specify the various multi-function logic blocks.
Figure 2B:
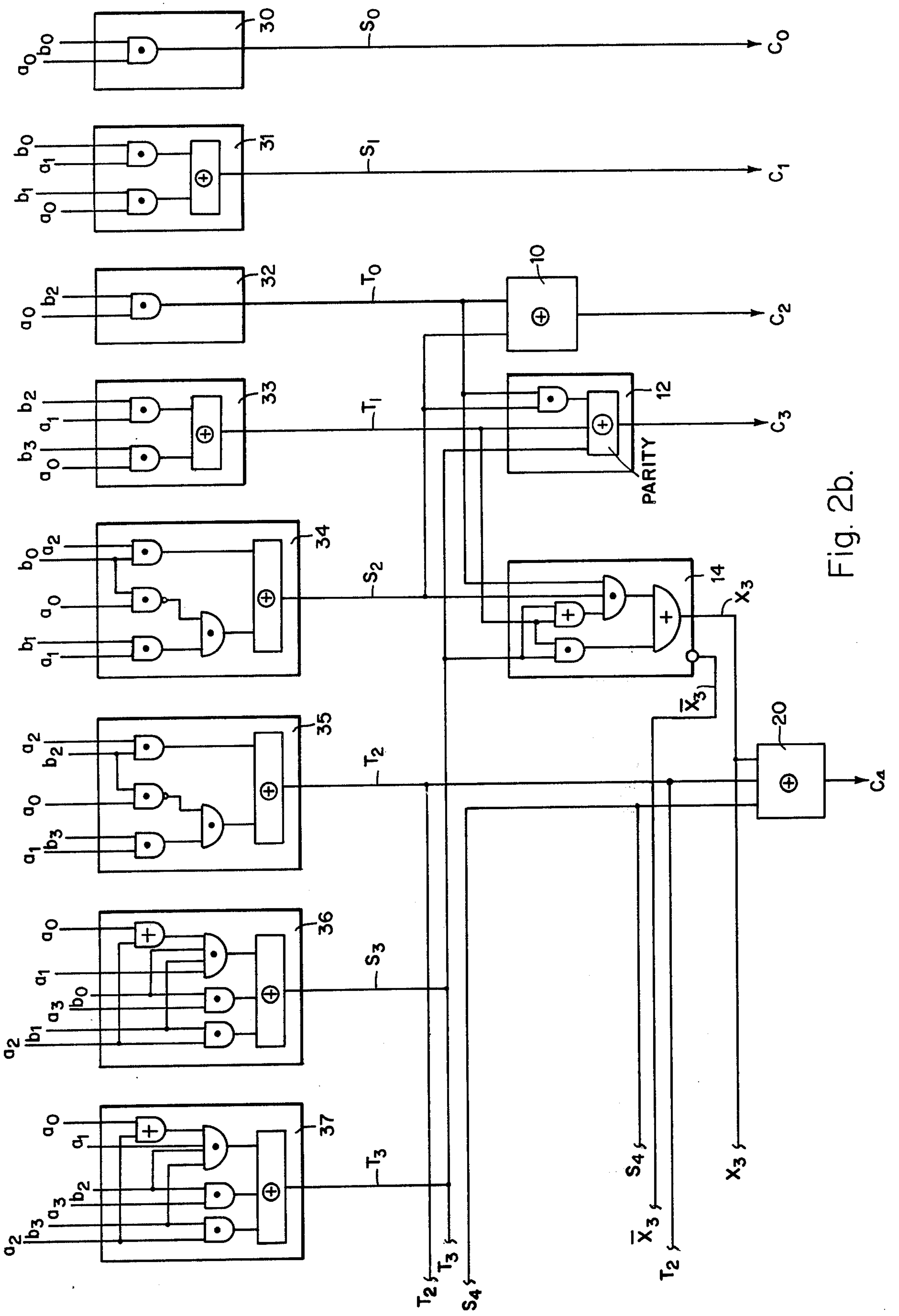

FIG. 2 depicts a logic partition for the complete 4 × 4-bit multiplier in which the 6 + 4 Adder and the array of logic blocks implementing S&T coefficients are combined. This diagram specifies the logical requirements of each logic block (in terms of an equivalent simple network involving AND, OR, EXCLUSIVE-OR, and INVERSION gates) and the interblock connections required. Since several different kinds of circuitry, other than cascode cells might be used to implement the logic function specified for each "box", FIG. 2 defines a family of 3-stage multiplier designs including the cascode cell implemented design of FIG. 6. The logic design shown in FIG. 2 is therefore the key to a complete understanding of this aspect of the present invention.

However, it should be noted in FIG. 2, logic blocks at the second level (10 through 18) generate logic functions of the first level (30 through 41) outputs (the $S$'s and $T$'s) which are used more than once at the third level (20 through 26).

But as will become more clear hereinafter, in the specific embodiment shown in FIG. 6, the first level functions $T_0$, $S_5$ and $T_5$ are not generated explicitly, but are only "partially" generated at the first level. The "completion" of $T_0$ and $S_5$ occurs within logic blocks at the second level where these functions are further combined with other $S$ & $T$ functions. Therefore, $T_0$ and $S_5$ are never "observable" logic signals. The "completion" of $T_5$ occurs within a third level logic block (cells 133 and 134 of FIG. 6), but it too is never observable because it is further combined with other signals in these cells.

3-Stage, 34 Cascode Cell 4 × 4-Bit Multiplier Logic Design

Two kinds of design refinements were undertaken in "converting" the logic partition of FIG. 2 to the design shown in FIG. 6. The first type of refinement involved utilization of special properties relating to some of the $S_i$ and $T_i$ functions.

TABLE I

BOOLEAN EXPRESSIONS FOR MULTIPLIER S&T FUNCTIONS $S_0 = a_0 b_0$
$S_1 = b_1 a_0 \oplus a_1 b_0$
$S_2 = a_2 b_0 \oplus a_1 b_1 (\overline{a_0 b_0})$
$S_3 = a_2 b_1 \oplus a_3 b_0 \oplus a_1 b_1 b_0 (a_2 + a_0)$
$S_4 = b_1 (\overline{a}_0 \overline{a}_2 a_3 + \overline{a}_1 \overline{a}_2 a_3 + a_3 \overline{b}_0 + a_1 a_2 \overline{a}_3 b_0)$
$S_5 = a_2 a_3 b_0 b_1 + a_0 a_1 a_3 b_0 b_1$
$T_0 = a_0 b_2$
$T_1 = b_3 a_0 \oplus a_1 b_2$
$T_2 = a_2 b_2 \oplus a_1 b_3 (\overline{a_0 b_2})$
$T_3 = a_2 b_3 \oplus a_3 b_2 \oplus a_1 b_3 b_2 (a_2 + a_0)$
$T_4 = b_3 (\overline{a}_0 \overline{a}_2 a_3 + \overline{a}_1 \overline{a}_2 a_3 + a_3 \overline{b}_2 + a_1 a_2 \overline{a}_3 b_2)$
$T_5 = a_2 a_3 b_2 b_3 + a_0 a_1 a_3 b_2 b_3$ As an example of this type of simplification, it is noted here that the $T_4$ and $T_5$ functions are disjoint (that is, their Boolean product, $T_4 . T_5$ is the zero function). In addition, it can be shown that $T_5 = a_3 b_3 \overline{T}_4$. Because of this, the $C_7$ output of the multiplier can be simplified as shown in FIG. 3. Because $T_4 . T_5 = 0$, the parity function 27 in the ULG generating $C_7$ may be replaced with an OR gate 31. Since cells can generate OR functions more economically than parity functions, the cell count required in the ULG is reduced. Because $T_5 = a_3 b_3 \overline{T}_4$, it is not really necessary to generate $T_5$ with the first level gate 41 as shown in FIG. 2. Instead it can be generated internally from $a_3$, $b_3$, and $T_4$ in the second level gate 30 of FIG. 3.

The second class of design simplifications involves making a broader, more general use of the cascode cell's synthesis capabilities. FIG. 4 comprising FIGS. 4*a* and 4*b* shows (FIG. 4*a*) the single cell synthesis of a "complex" 4-input function, $C_I = a_0 b_1 + a_1 b_0$. No single conventional gate and no pair of conventional gates can perform that synthesis. In this and subsequent figures, $X$, $Y$, and $Z$ defined respectively as:

$X = x_1 + x_2 + x_3 + x_4$
$Y = y_1 + y_2$
$Z = z_1 + z_2 + z_3$ represent input functions, the cell 40 produces the output functions:

$A = \overline{X} + \overline{Z}$ $B = Y + \overline{Z}$ $C = \overline{Y} + Z$ $D = Y + Z$ and the load cells 42 and 43 provide a wired AND function.

FIG. 4*b* shows the synthesis of the six variable function $\overline{T}_3$ utilizing the cells 45 and 46 and two load cells 47 and 48. It is noted there that output e.g. 49 and "collector-dot" e.g. 50 connections used are just those required in the synthesis of typical 4-variable functions and therefore, no additional delay is encountered. As explained in the above referenced co-pending application, such a connection prior to the load cells 47 and 48 is the logical equivalent of an "AND" gate, while such a connection following load cells is the equivalent of an "OR" gate.

Figure 5:
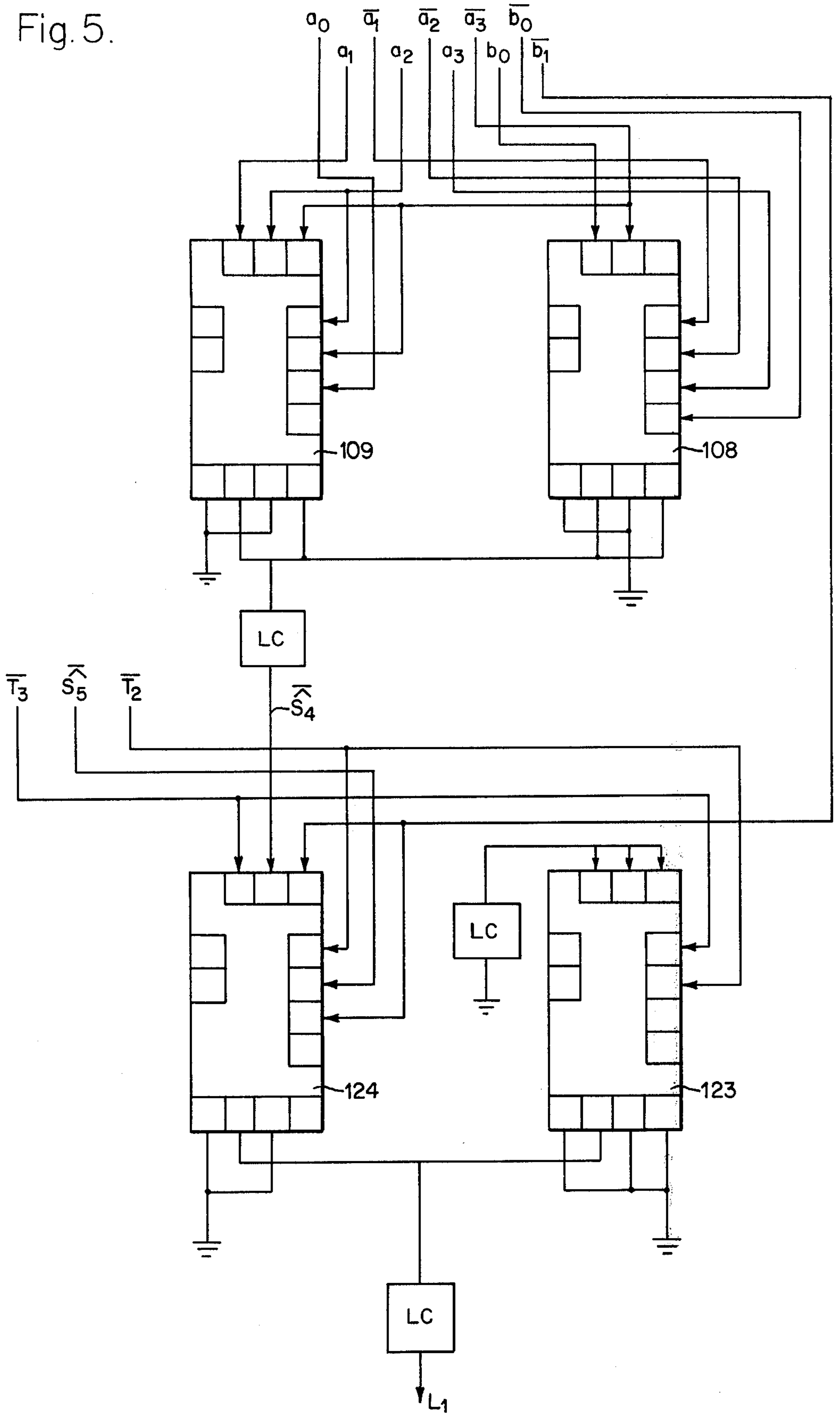
FIG. 5 also illustrates a synthesis using universal logic gates, but of a multiplier logic function of a higher degree of complexity that is illustrated in FIG. 4.
Figure 6A:
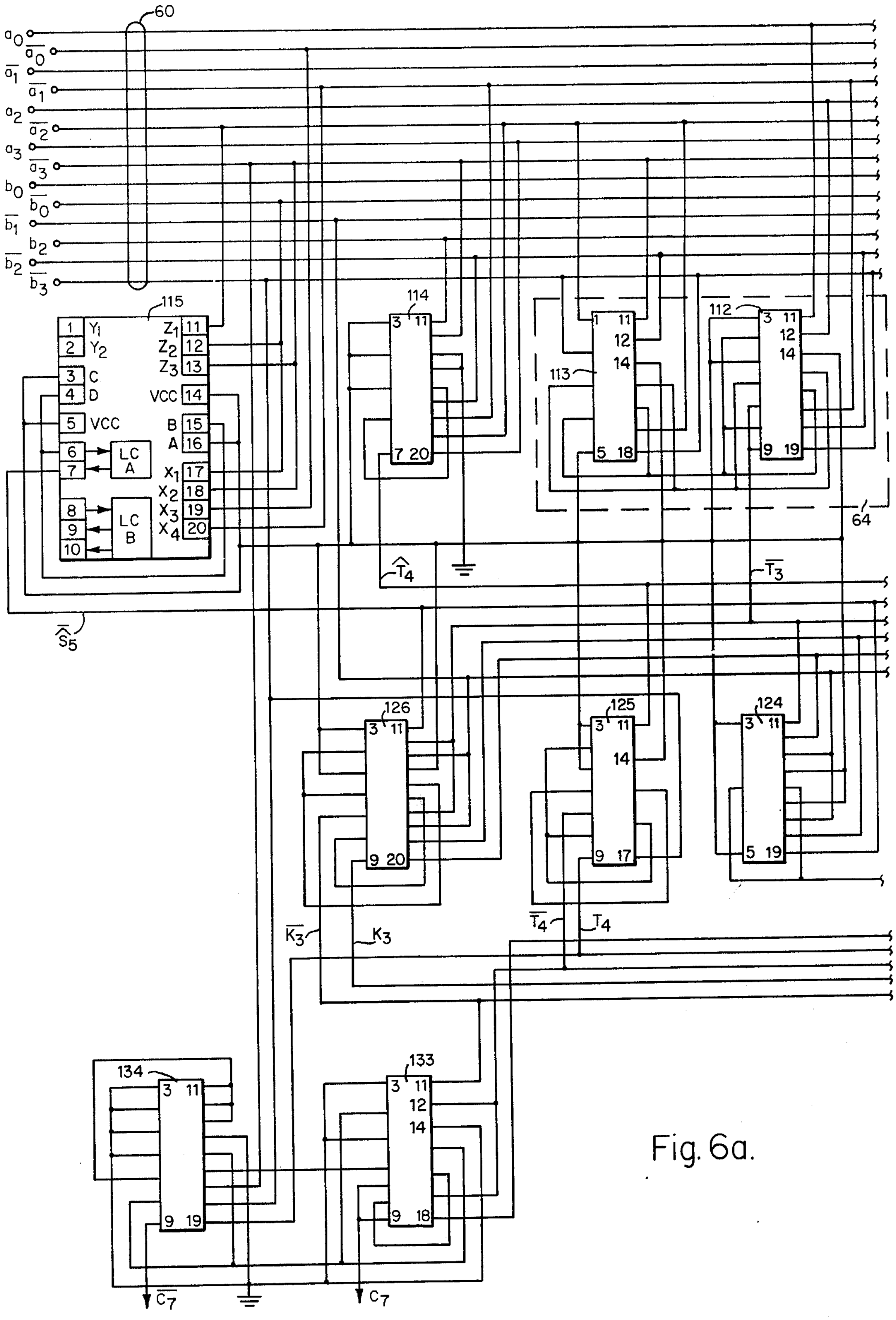
FIG. 6 (comprising FIGS. 6*a* through 6*d*, assembled as indicated) illustrates the interconnection scheme of a preferred embodiment of the present invention using the logic cells of the above reference application to form a 4 × 4-bit all-positive multiplier.
Figure 6B:
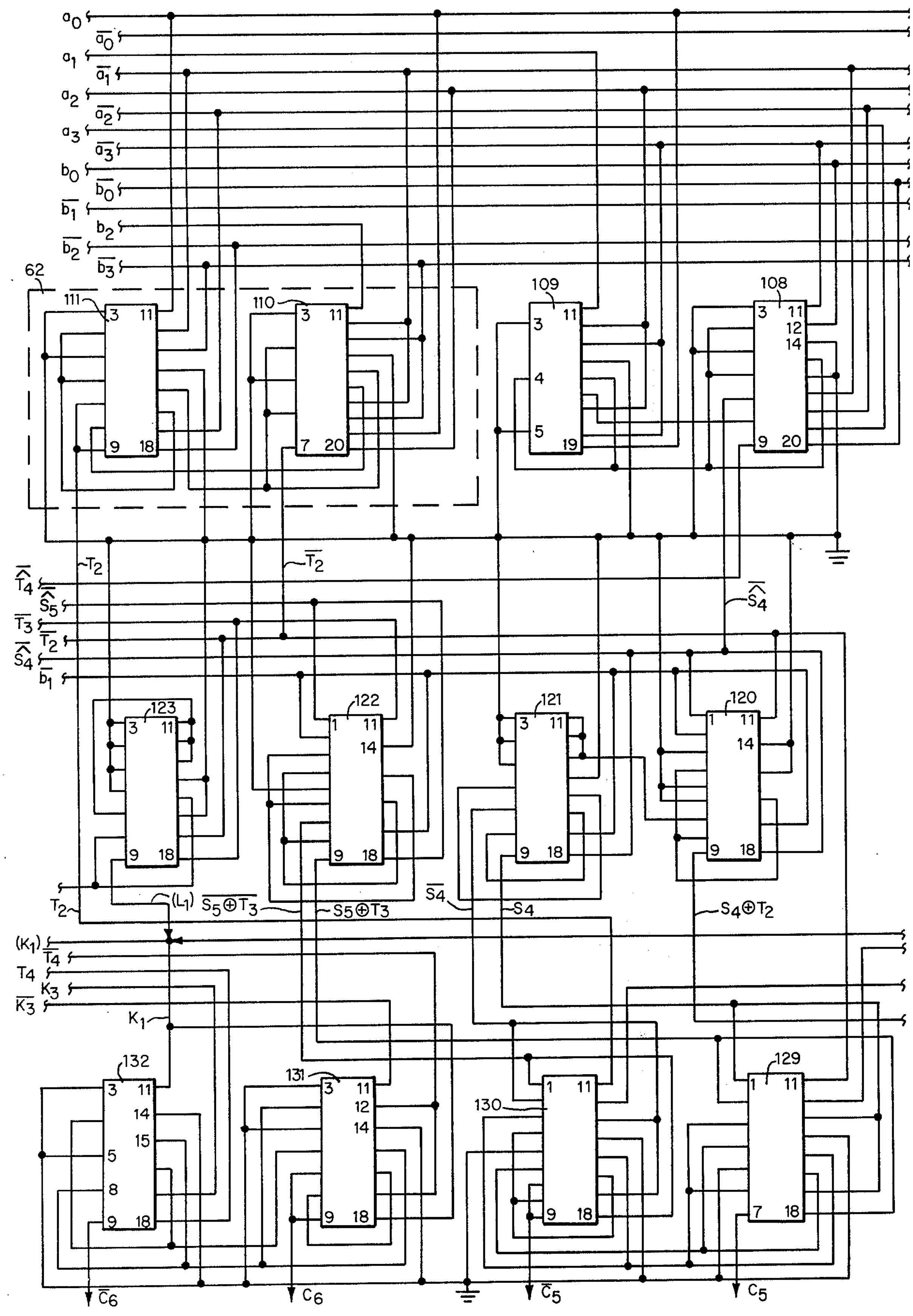
Figure 6C:
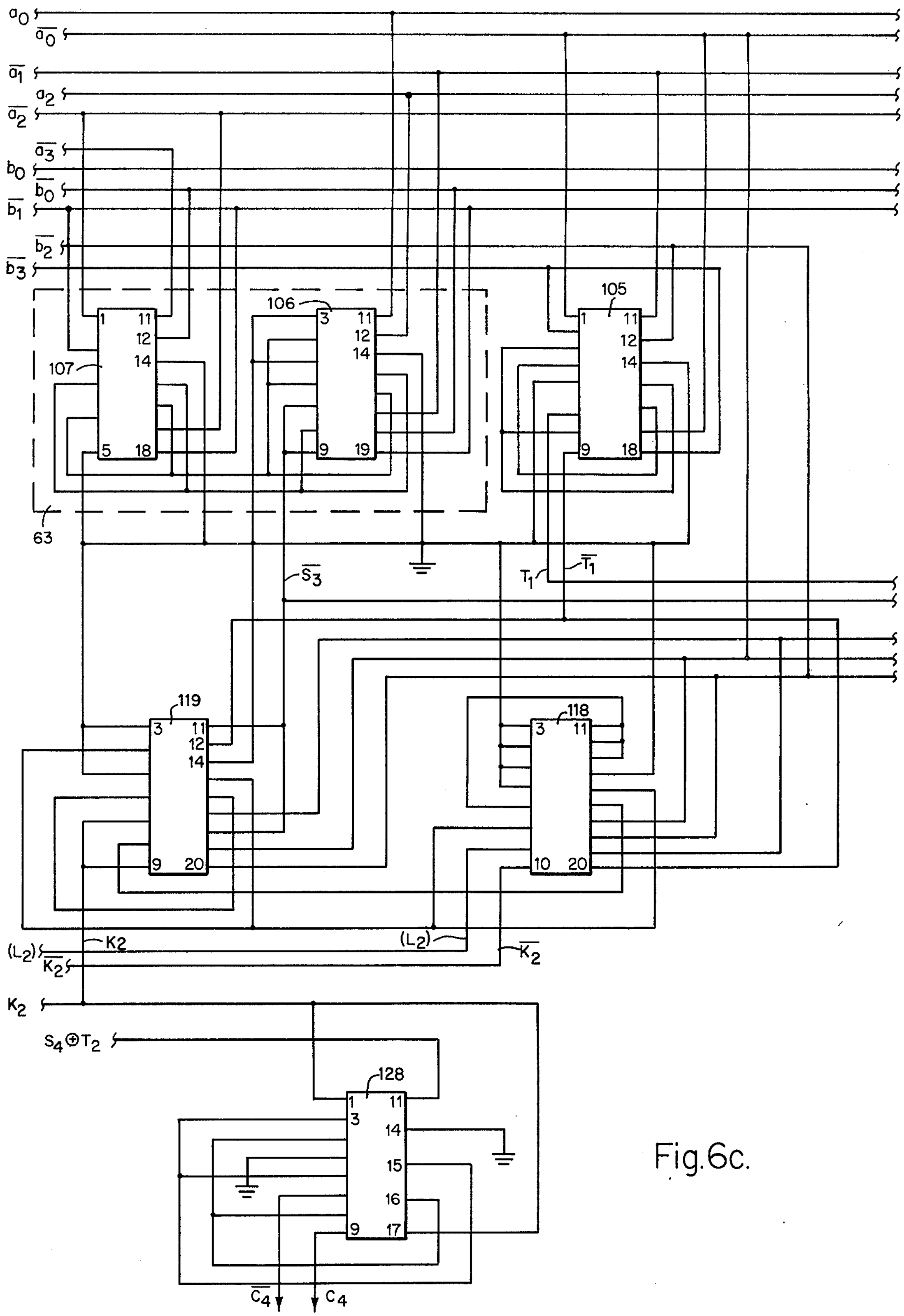
Figure 6D:
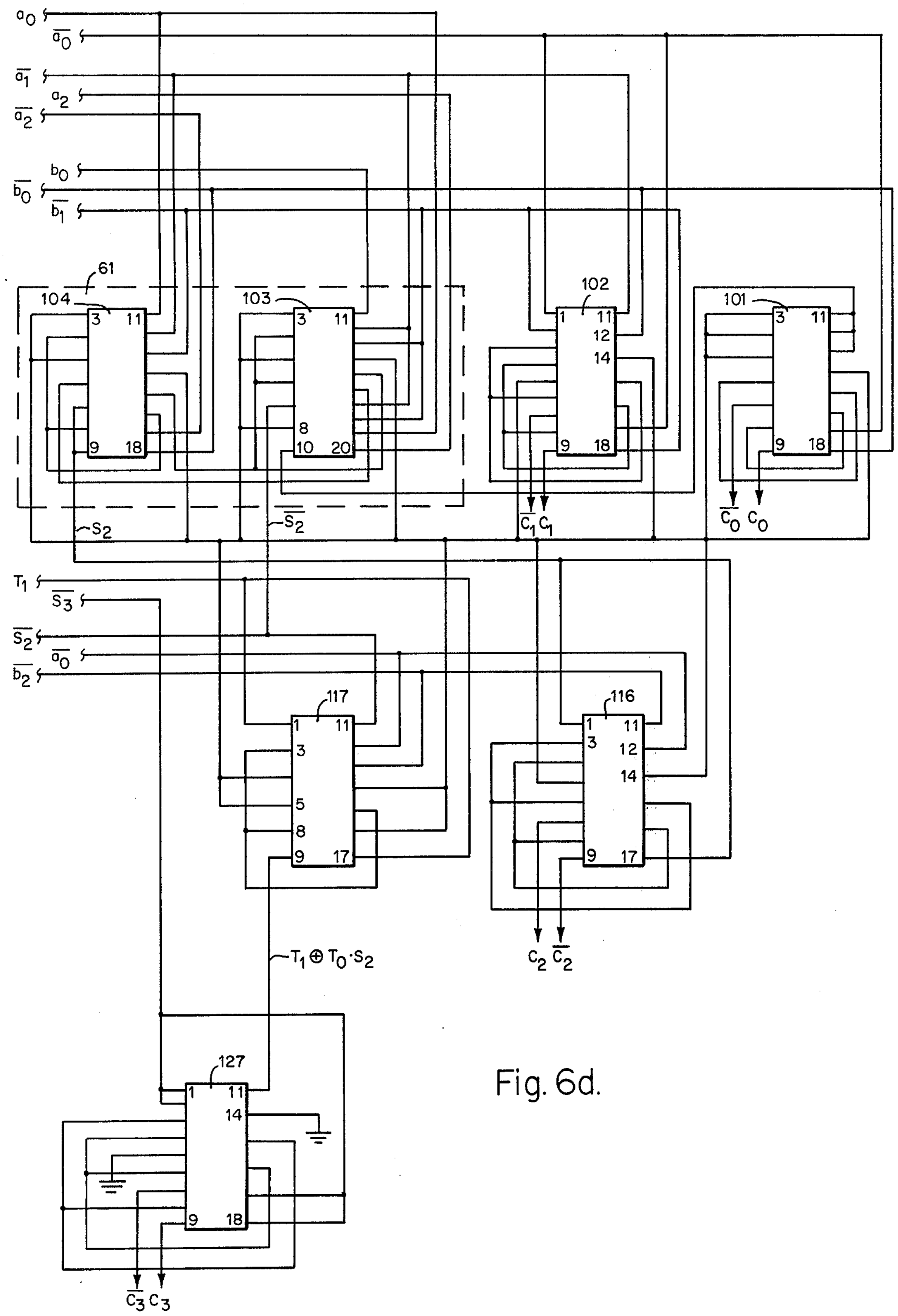

In some cases, two cell, 1-stage syntheses of very "complex" functions such as $S_4$, $T_4$, and $S_5$ aren't possible without exceeding the collector-dotting limits imposed in 2-cell 4-variable function synthesis to limit delay. In these cases "partial" functions $\hat{S}_4$, $\hat{T}_4$, and $\hat{S}_5$ are synthesized in 2-cell blocks and then each respective synthesis is completed at a succeeding stage which might otherwise not be used to its fullest capability. The synthesis of the function "$L_1$" is shown in FIG. 5, which involves the functions $S_4$ and $S_5$ to demonstrate the way the functions $\hat{S}_4$ and $\hat{S}_5$ are "completed" at the second stage comprising ULG cells 124 and 125 (see also FIG. 6).

After several simplifications of the types discussed above, the final design of FIG. 6 emerges. There, each block is a 2-level cascode cell and the entire design is implemented in 3 stage delays by the 34-cell array.

It is noted in particular that the 5-variable fundtions $S_2$ and $T_2$ as well as the 6-variable functions $\overline{S}_3$ and $T_3$ are each realized in 2-cell blocks, indicated by reference numerals 61, 62, 63, and 64 respectively. The cell collector and load cell interconnections there are precisely those used most frequently in 4-variable function synthesis. Moreover, the 4-variable function $T_1$ was realized in a single cell 105 as, of course, were $S_0$ (=$C_0$) and *Shd 1* (=$C_1$).

Of the remaining *S* and *T* functions, $T_5$ isn't implemented because of the simplification shown in FIG. 3, while $S_5$, $S_4$, and $T_4$ are implemented as $S_5 = \hat{S}_5 \,.\, b_1$, $S_4 = \hat{S}_4 \,.\, b_1$ and $T_4 = \hat{T}_4 \,.\, b_3$. Here the 5-variable functions $\hat{S}_5$, $\hat{S}_4$, and $\hat{T}_4$ are each realized by a 2-cell block again with the 2 cells interconnected as in typical 4-variable function synthesis.

FIG. 6 is the wiring diagram which may be used to designate the multilayer metal routing and cell interconnection large scale integration LSI version of multiplier. In the figure, each box signifies a cascode cell (circuit). The numbers in the smaller boxes along the inside vertical edges of each cell (symbol) designate the bonding pad numbers for the individual cell IC dies. This numbering would be different if a different IC cell layout format were used. The letters of block 115, however, identify the cell inputs (*X,Y,Z*) and output current nodes (*A,B,C,D*) and the arrows identify load cell input and output nodes. These functional designations are the same for all cells in the figure and are defined in greater detail in the above referenced "Universal Logic Gate" Application. Consequently, the wiring diagram of FIG. 6 therefore specifies the logical operation of the array.

Referring to FIG. 6, it is noted that the multiplier input signals 60 (and their logical complements) incoming at the upper left of the drawing are fed to cell inputs. Outputs from the first row of cells (101 through 115) whose inputs are entirely comprised of the multiplier input signals, are fed to cells in the second and third rows or generate multiplier outputs directly (cells 101 and 102). Inputs to the second row of cells (116 through 126) are either multiplier input signals or are derived only from outputs from cells in the first row. Cell 116 produces the third multiplier output bit and all other outputs from cells in the second row drive third row cells (127 through 134). Multiplier inputs $\overline{a}_3$ and $\overline{b}_3$ feed cell 134 along with signals produced in the second row. In this regard, it should be noted that $L_1 = \overline{(S_5 + T_3) \,.\, (S_4 + T_2)}$; that $L_2 = \overline{K}_2$; and that $K_1 = L_1 + L_2$, where $K_1$ is formed as a wired "OR". Otherwise, cells in the third row are fed exclusively by signals output from cells in the first and second rows. All remaining multiplier output signals are produced by cells in the third row. In no case is any output from a cell in any row fed to an input of another cell in the same or higher row (constant programming signals are fed to cells 101, 118, and 123 from load cell outputs from other cells in the same row, however). Consequently, the cells are interconnected in a feed forward only manner and therefore the multiplication delay is that subtended by only 3-cell-stages.

Logic Design of a 3-Stage 3 × 4-bit 2's Complement Binary Multiplier

Figure 7A:
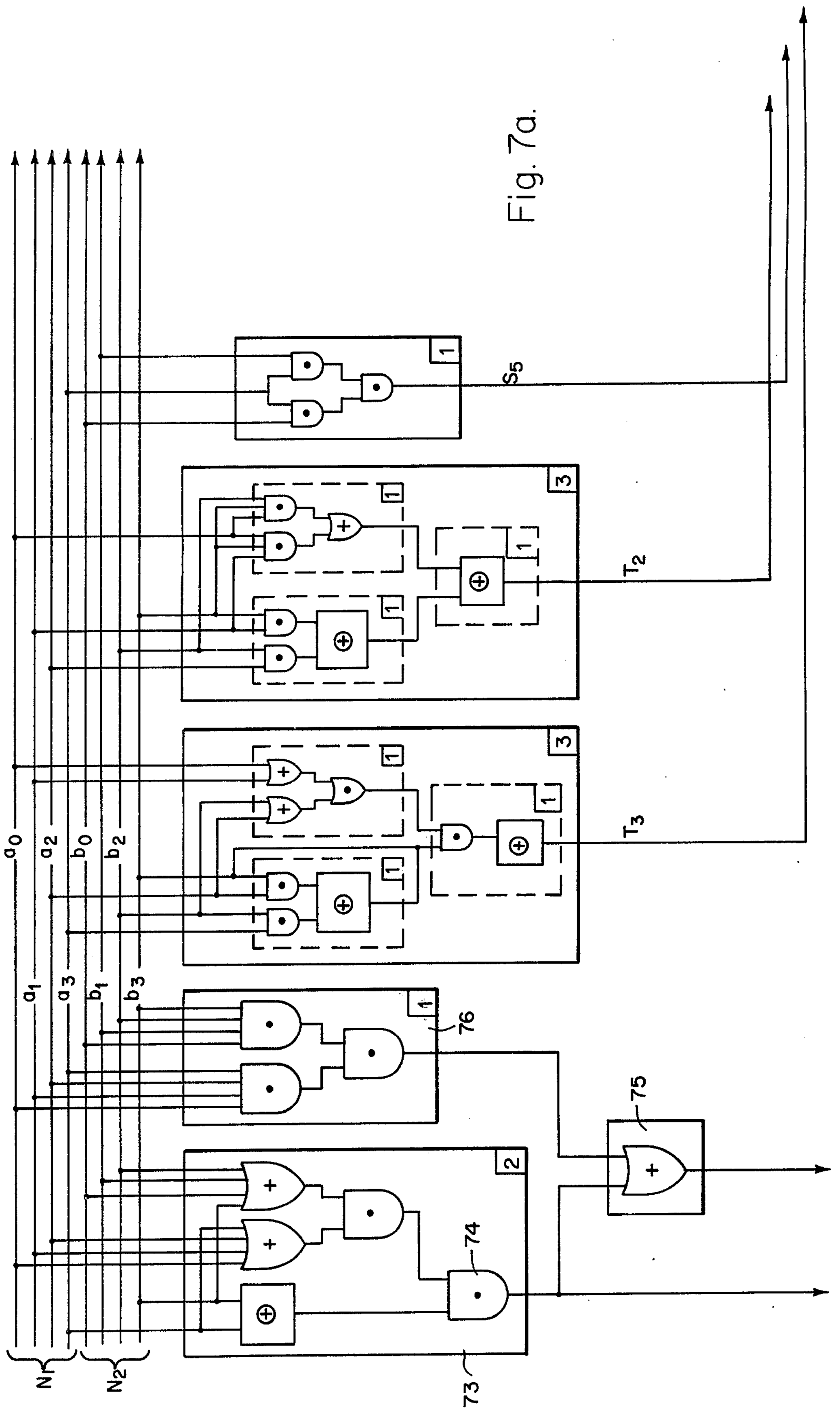
FIG. 7 (comprising FIGS. 7*a* and 7*b*, assembled as indicated) represents an alternate embodiment of the present invention and is a logic synthesis diagram specifying a 3-stage 4 × 4-bit 2's complement multiplier.
Figure 7B:
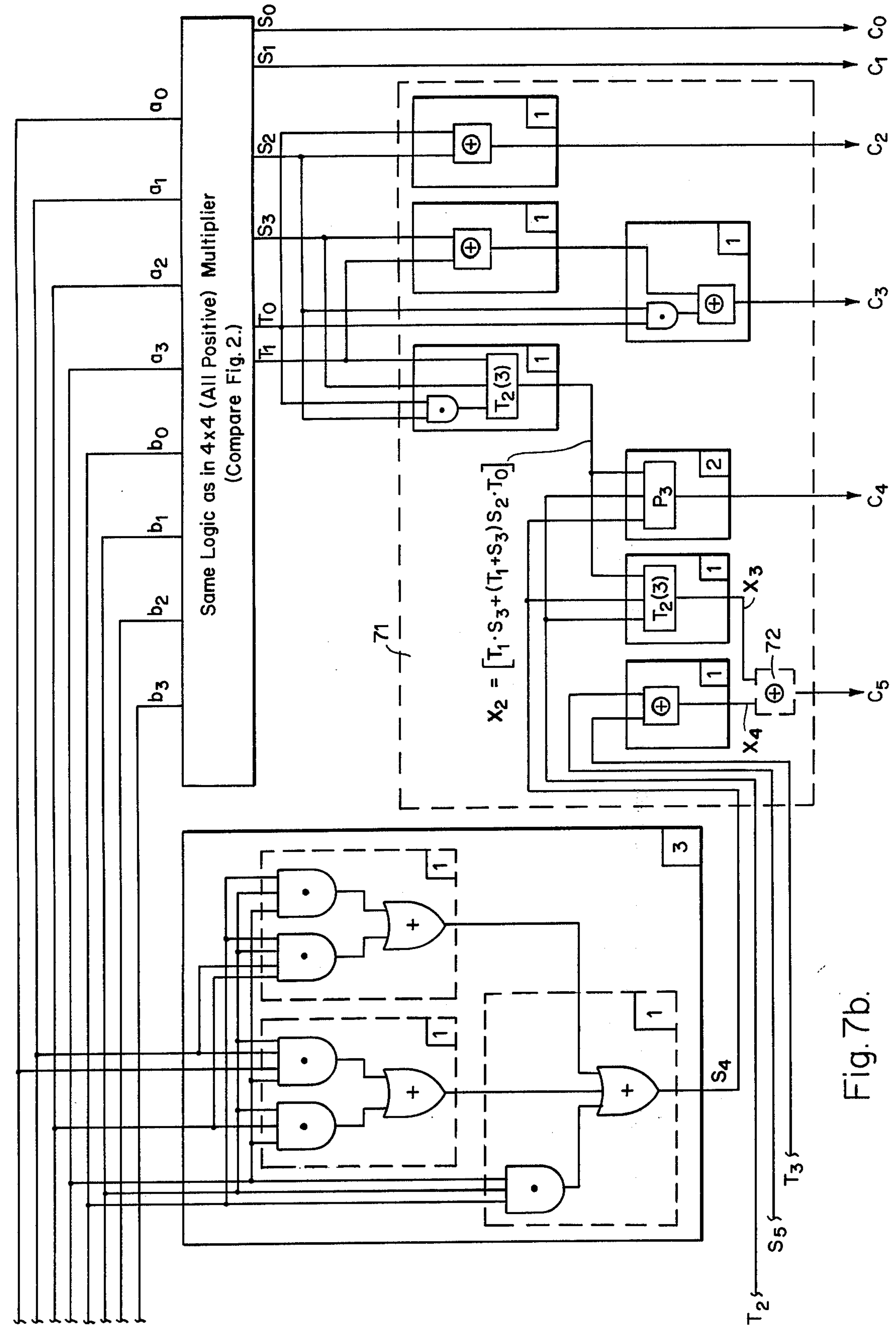

The same techniques employed in the design of the 3 stage, 4 × 4-bit (all positive) binary multiplier described in detail above, can be used to design a 3-stage 4 × 4-bit 2's complement multiplier (FIG. 7). The mathematical logic partition approach is identical and the resulting design utilizes nearly the same hardware configuration for two reasons. First, as is well known, the 4 least significant output bit functions are identical to those of the (all positive) multiplier. Second, most of the internally generated "S" and "T" functions are the same, also. Moreover, the two most significant output bits of the 2's complement multiplier, while different functions from those in the all positive multiplier, are actually easier to generate than their counterparts.

The foundation of the 4 × 4-bit two's complement multiplier design is the decomposition of the 4 × 4-bit multiplication operation into two 2 × 4-bit multiplications. The products formed in these "component" multiplications feed a 4-bit modified adder whose output sum array comprises the central four of the eight multiplier output bits. (The two least significant and the two most significant output bits are generated directly by relatively simple logic and are not outputs of the adder).

The multiplier inputs in two's-complement coding are expressed as:

$$N_1 = -a_3 2^3 + a_2 2^2 + a_1 2^1 + a_0 2^0$$

and $$N_2 = -b_3 2^3 + b_2 2^2 + b_1 2^1 + b_0 2^0,$$

where the constants $a_i$ and $b_i$ are either 0 or 1. Note that $a_3$ and $b_3$ are each preceded by a negative sign so that the first term of each expression has a value of either 0 or −8. The numbers that can be encoded by the above expressions will therefore range from −8 to +7.

The product $N_1 . N_2 = N_3$ defined by $$N_3 = (-a_3 2^3 + a_2 2^2 + a_1 2^1 + a_0) . (-b_3 2^3 + b_2 2^2 + b_1 2^1 + b_0)$$

may be written as $$N_3 = (-a_3 2^3 + a_2 2^2 + a_1 2^1 + a_0) . (-b_3 2^3 + b_2 2^2) + (-a_3 2^3 + a_2 2^2 + a_1 2^1 + a_0) . (b_1 2^1 + b_0)$$

or $$N_3 = 2^2 [(-a_3 2^3 + a_2 2^2 + a_1 2^1 + a_0) . (-b_3 2^1 + b_2)] + (-a_3 2^3 + a_2 2^2 + a_1 2^1 + a_0) . (b_1 2^1 + b_0).$$

In the last equation, the product, $N_3 = N_1 . N_2$ is expressed as the sum of the products formed in two "component" 2 × 4-bit multiplications in which the first 2 × 4-bit product is "weighted" by $2^2$ before it is added to the second. Before this weighting, the first product is a number between −14 (7 × 2) and +7 (7 × 1).

The second product is a number between −24 (31 8 × 3) and 21 (7 × 3). Therefore, the two's complement encodings for each of these 2 × 4-bit products are .

$$T = -T_4 2^4 + T_3 2^3 + T_2 2^2 + T_1 2^1 + T_0 \ (T_i = 0.1)$$

and $$S = S_5 2^5 + S_4 2^4 + S_3 2^3 + S_2 2^2 + S_1 2^1 + S_0 \ (S_i = 0.1)$$

so that $N_3 = N_1 . N_2$ is expressable as $$N_3 = 2^2 T + S$$

or $$N_3 = 2^2 (-T_4 2^4 + T_3 2^3 + T_2 2^2 + T_1 2^1 + T_0) + (-S_5 2^5 + S_4 2^4 + S_3 2^3 + S_2 2^2 + S_1 2^1 + S_0).$$

A graphical delineation of operations performed when the 4 × 4-bit multiplication implements this expression is as follows:

| | | | | | | | | |
|---|---|---|---|---|---|---|---|---|
| ($2^7$) | ($2^6$) | ($2^5$) | ($2^4$) | ($2^3$) | ($2^2$) | ($2^1$) | ($2^0$) | |
| | | $-S_5$ | $S_4$ | $S_3$ | $S_2$ | $S_1$ | $S_0$ | (S) |
| ± | $-T_4$ | $T_3$ | $T_2$ | $T_1$ | $T_0$ | | | ($2^2$ . T) |
| $-C_7$ | $C_6$ | $C_5$ | $C_4$ | $C_3$ | $C_2$ | $C_1$ | $C_0$ | |

where the $C_1$ are the coefficients in the binary expansion of the product $N_3 = N_1 . N_2$.

The adder 71 used in this embodiment is a "modified" 4-bit adder in the following two respects: First, $S_5$ has negative weight (thus subtracting from the sum instead of adding) and second, the last "carry" or "borrow" is ignored because it affects only $C_6$ and $C_7$ which are generated separately. The equations for the output bits of the modified adder are shown in Table 2 and its logic synthesis appears within the dashed area 71 of FIG. 7. A two-stage, eight-cell synthesis is made possible by using "wired-logic" 72 to synthesize the last exclusive "OR" operation in the generation of $C_5$. It differs from the adder (FIG. 2) in the real multiplier only in the generation of $C_5$ and the output carry bit. Note that $T$'s coefficient array is shifted two places to the left relative to the $S$ array since $T$ is multiplied by $2^2$, and that $S_5$ and $T_4$ carry negative weights in the summands $S$ and $2^2 . T$. The product $N_3$ will assume values between −56 (7 × −8) and 64 (8 × 8), so the seven positively weighted bits $C_6$ through $C_0$ are required to represent positive values of $N_3$. These bits are used in conjunction with an additional "sign-bit" $C_7$ (which has a weight of −128) to represent negative numbers. Inspection of the above addition $S + 2^2 T$ reveals that $S_0$ and $S_1$ $S$-coefficients are the coefficients $C_0$ and $C_1$ in the expansion for $N_3 = N_1 . N_2$ and are therefore output from the multiplier "as they are" at the -array logic block outputs. Since the sign bit $C_7$ and the bit $C_6$ can be generated directly with a small amount of logic (resulting in minimum delay), the only remaining bits of $S + 2^2 . T$ to be generated are $C_5$ through $C_2$; thus, only a modified 4-bit adder is required. The graphical delineation of this modified adder is as follows:

| | | | | |
|---|---|---|---|---|
| | $-S_5$ | $S_4$ | $S_3$ | $S_2$ |
| + | $T_3$ | $T_2$ | $T_1$ | $T_0$ |
| | $C_5$ | $C_4$ | $C_3$ | $C_2$ |

Table 2 gives the Boolean expressions for the output bits of the modified adder.

TABLE 2

BOOLEAN EXPRESSIONS FOR 2'S COMPLEMENT 4 × 4-BIT ADDER OUTPUTS $C_2 = S_2 \oplus T_0$
$C_3 = T_1 \oplus S_3 \oplus T_0 S_2$
$C_4 = T_2 \oplus S_4 \oplus [T_1 S_3 + (T_1 + S_3) S_2 T_0]$
$C_5 = T_3 \oplus S_5 \oplus [T_2 S_4 + (T_2 + S_4) (T_1 S_3 + (T_1 + S_3) S_2 T_0)]$ The logic functions which generate the 2 × 4-bit multiplications are specified in Table 3. Table 4 shows the logic functions which generate the output bits $C_6$ and $C_7$.

TABLE 3

BOOLEAN EXPRESSIONS FOR 2'S COMPLEMENT MULTIPLIER $S$ AND $T$ FUNCTIONS $*S_0 = a_0 b_0 \ (= C_0)$
$*S_1 = b_1 a_0 \oplus a_1 b_0 \ (= C_1)$
$*S_2 = a_1 b_1 \oplus a_2 b_0 \oplus a_1 b_1 a_0 b_0$
$*S_3 = a_2 b_1 \oplus a_3 b_0 \oplus a_1 b_1 b_0 (a_2 + a_0)$
$S_4 = a_3 b_1 [a_2 + a_0 a_1 + \overline{b}_0] + a_2 a_1 b_1 b_0 + a_3 b_0 \overline{b}_1$
$S_5 = a_3 (b_0 + b_1)$
$*T_0 = a_0 b_2$
$*T_1 = a_0 b_3 \oplus a_1 b_2$
$**T_2 = a_2 b_2 \oplus a_1 b_3 \oplus a_0 b_3 (\overline{a . b_2})$
$**T_3 = a_3 b_2 \oplus a_2 b_3 \oplus b_3 (a_1 + a_0) (\overline{a_2 b_2})$ $T_4$ and $T_5$ are not implemented.

*Identical to functions used in (all positive) 4 × 4-bit multiplier.
**Very similar to function used in (positive) 4×4-bit multiplier. For that multiplier, $T_2$ and $T_3$ can be written as
$T_2 = a_2 b_2 \oplus a_1 b_3 \oplus a_0 b_3 (a_1 b_2)$, , and
$T_3 = a_3 b_2 \oplus a_2 b_3 \oplus b_3 (a_2 + a_o) (a_1 b_2)$

TABLE 4

BOOLEAN EXPRESSIONS FOR BITS $C_6$ AND $C_7$ OF MULTIPLIER $C_6 = (\overline{a}_0 \overline{a}_1 \overline{a}_2 \overline{a}_3 . \overline{b}_0 \overline{b}_1 \overline{b}_2 b_3) + C_7$ where
$C_7 = (a_3 \oplus b_3) (a_0 + a_1 + a_2 + a_3) (b0 + b_1 + b_2 + b_3)$ A logic synthesis of the complete 2's complement 4 × 4-bit multiplier is shown in FIG. 7. The synthesis of the "internal" functions $S_0$ through $S_3$ and $T_0$, $T_1$ are not shown explicitly because these functions are identical to those in the (all positive) 4 × 4-bit binary multiplier.

In the diagram, each block contains a gate equivalent circuit suggestive of its cascode cell implementation.

The numbers in the lower right-hand corner of each logic block indicate the number of cascode cells required to synthesize the block's function.

It has been noted that in the block 73 (comprising two cascode cells) the AND Gate 74 may be implemented as a wired AND within the cascode cell and the OR gate 75 may be implemented as a wired or using a spare load cell as herein before described, thereby ORing the output from blocks 73 and 76.

Construction of Larger Multipliers using 4 × 4-bit Multipliers as Components

Frequently for relatively low volume applications it is both expedient and economical to construct functional units such as multipliers from available components even though this does not result in an optimal design. The reason for this approach is that the requirements (e.g., 8 bits or 11 bits) imposed on multipliers differ from application to application and the volume requirements are seldom sufficient to justify the design and tooling costs associated with custom multiplier mechanization. Since these constraints are imposed on the manufacture of many systems such as "small-volume" computer peripheral equipments, there has been for some time a need for a very high speed multiplier for use as a component in the mechanization of larger multipliers.

An extension of the same basic logic partition scheme embodied in the internal design of the 4 × 4-bit multiplier of the present invention can be used to derive the design of larger multipliers in which the individual 4 × 4-bit multipliers are used as components along with "standard" full-carry-look-ahead adders. The methodology is demonstrated below through the detailed description in a preferred embodiment of an 8 × 8-bit multiplier. The resulting multiplier is found to require an overall serial delay of 10 gating stages.

8 × 8-Bit Real Multiplier Design

The 8 × 8-bit multiplier generates the product $N_3 = N_1 \cdot N_2$ where $$N_1 = \sum_{k=0}^{7} c_k 2^k,\; N_2 = \sum_{k=0}^{7} d_k 2^k, \text{ and the product}$$

$$N_3 = \sum_{j=0}^{15} P_j 2^j$$

with every $c_k$, $d_k$, $P_j$ either 1 or 0.

The logic partition is initiated by expressing $N_1$ and $N_2$ as $$N_1 = 2^4 A + C$$

$$N_2 = 2^4 b + D$$

where $A$, $B$, $C$, and $D$ are non-negative integers, each having a 4-bit binary representation. Then the product, $N_3$, may be written as $$N_3 = N_1 \cdot N_2 = (2^4 A + C)\,(2^4 B + D) = 2^8 AB + CD + 2^4 (BC + AD).$$

A useful representation of the latter sum expression in partial product notation is suggested below.

$$2^{15}2^{14}2^{13}2^{12}2^{11}2^{10}2^{9}2^{8}2^{7}2^{6}2^{5}2^{4}2^{3}2^{2}2^{1}2^{0} \quad \text{(Weight)}$$
$$W_7W_6W_5W_4W_3W_2W_1W_0 \quad \text{(CD)}$$
$$X_7\,X_6\,X_5X_4X_3X_2X_1X_0\,0\,0\,0\,0 \quad (2^4\text{BC})$$

-Continued $$Y_7\,Y_6\,Y_5Y_4Y_3Y_2Y_1Y_0\,0\,0\,0\,0 \quad (2^4\text{AD})$$
$$Z_7\,Z_6\,Z_5\,Z_4\,Z_3\,Z_2\,Z_1\,Z_0\,0\,0\,0\,0\,0\,0\,0\,0 \quad (2^8\text{AB})$$
$$P_{15}P_{14}P_{13}P_{12}P_{11}P_{10}P_9P_8P_7P_6P_5P_4P_3P_2P_1P_0 \quad (N_1 \,.\, N_2)$$

The above partial product array is representative of the logic design described in the following and shown in block diagram form in FIG. 8. In the design, the products $CD$, $BC$, $AD$, and $AB$ are generated first by a parallel array of 4 4×4-bit multipliers 81 through 84.

The term $2^4\,(BC + AD)$ is developed from the 4×4 multiplier output array through 8 × 8-bit adder 85. Its inputs are the $B{\cdot}C$ and $A{\cdot}D$ terms shown as $X_0$–$X_7$ and $Y_0$–$Y_7$ resp. in FIG. 8. The $2^4$ weighting of the sum is developed implicitly in the way that the adder's output array is subsequently used.

The term $2^8 AB + CD$ is generated implicitly by a simple concatenation of the $AB$ and $CD$ arrays. No actual addition is performed in forming this term because the $2^8$ weighting of the AB array makes all of its nonzero bits disjoint from those of the $CD$ array.

Figure 8:
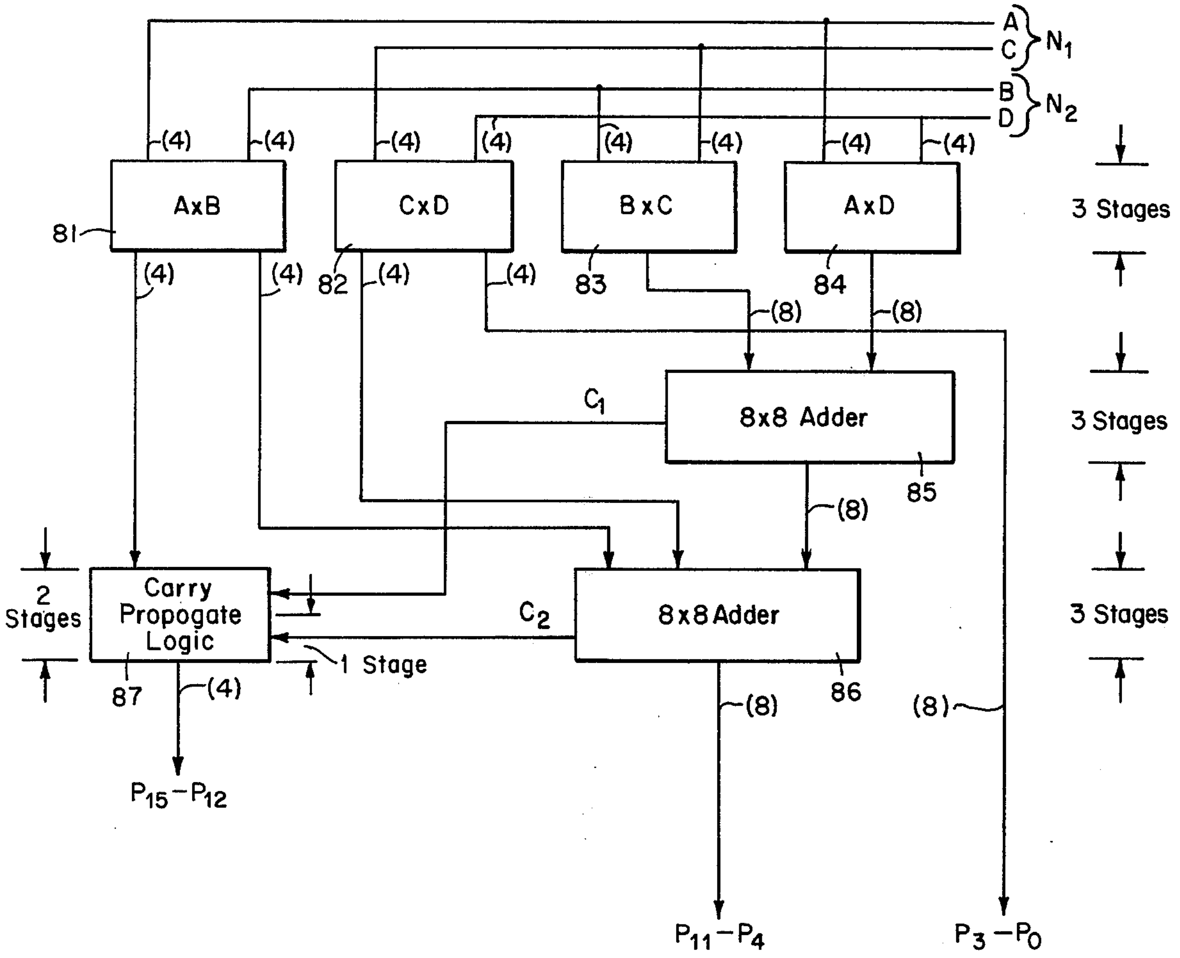
FIG. 8 illustrates how the multiplier of the present invention may be used as a module to construct an 8 × 8-bit multiplier.

The four least significant bits (LSB's) produced in this array by the multiplier forming the CD product are shown as $W_3 - W_0$ in FIG. 8. These components of the $2^8 AB + CD$ sum are disjoint from the LSBs of the sum $2^4(BC + AD)$ as shown eariler in the partial products diagram. Consequently, $W_3 - W_0$ make up the 4 LSBs of the ensemble multiplier output and are fed to its output array where they are relabeled as $P_3 - P_0$ respectively.

The fourth through the twelfth bits of the ensemble multiplier output array are generated by a second 8 × 8-bit adder 86. Its inputs are the entire output of the first adder ($2^4\,(BC + AD)$) and the "middle" 8 bits of the $2^8 AB + CD$ terms, denoted by $Z_0 - Z_3$ and $W_4 - W_7$ in FIG. 8. This adder's outputs constitute multiplier output bits $P_4 - P_{11}$.

The final four MSBs of the overall adder are formed by adding the two adder carry outputs $C_1$ and $C_2$ to the last $Z_4 - Z_7$ bits of the $2^8 AD + CD$ array. This addition can be performed using a commercially available 4-bit adder such as the Motorola *MC*10121. A reduction in overall multiplier delay of about 2–3 stages can be achieved, however, by using special carry propagate logic circuitry 87 to take advantage of the properties of this particular application. When ULG/cascode cells are used to implement this circuit, it can perform the required operations in just one additional gating stage.

Carry Propagate Logic Circuit

The logical expressions for the output bits $P_{15} - P_{12}$ from the carry propagate logic circuit are as follows:

$$P_{12} = Z_4 \oplus C_1 \oplus C_2$$

$$P_{13} = Z_5 \oplus [Z_4\,(C_1 + C_2) + C_1C_2]$$

$$P_{14} = Z_6 \oplus Z_5\,[Z_4\,(C_1 + C_2) + C_1C_2]$$

$$P_{15} = Z_7 + Z_6Z_5\,[Z_4\,(C_1 + C_2) + C_1C_2]$$

Figure 9:
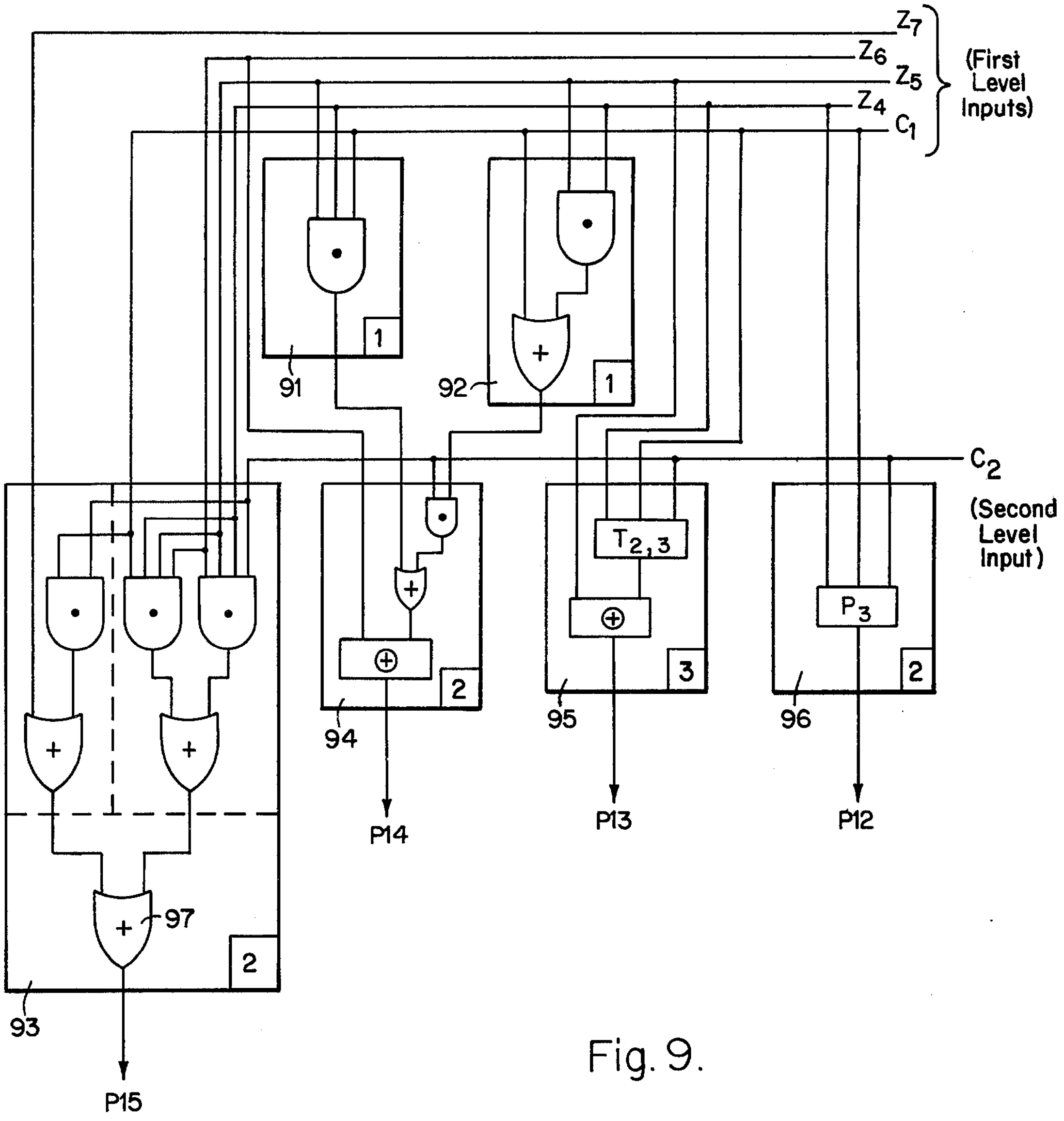
FIG. 9 shows the logic synthesis using the logic cells of the above reference application for implementing the carry propagate circuit of FIG. 8.

A logic design for the carry propagate circuit which generates these bits is shown in FIG. 9. This design uses 13 cascode cells comprising blocks 91 through 96 and is illustrated using the same symbology as was used in FIG. 7. It is to be noted that OR gate 97 is a wired OR. From FIG. 8 it is evident that the variable $C_2$ arrives at the circuit of FIG. 9 via a path subtending 9 serial gating stages, and that all other variables arrive via paths subtending at most 6 serial stages. The circuit therefore introduces only one additional gating stage delay in the worst case path. Thus, the worst case path through the multiplier encompasses 10-gate delay stages.

Although the invention has been described above in terms of specific embodiment thereof, no doubt many modifications thereto and varients thereof will occur to those skilled in the digital modifier art and such modifications and variations will still lie within the spirit of the present invention.

what is claimed is:

1. A 4 by 4 bit multiplier for multiplying a first 4-digit binary number $$A = A_0 = 2.A_1 + 4{\cdot}A_2 + 8{\cdot}A_3$$

by a second 4-digit binary number $$B = B_0 + 2{\cdot}B_1 + 4{\cdot}B_2 + 8{\cdot}B_3$$

to form an 8-digit binary product $$C = C_0 + 2{\cdot}C_1 + 4{\cdot}C_2 + 8{\cdot}C_3 + 16{\cdot}C_4 + 32{\cdot}C_5 + 64{\cdot}C_6 + 128{\cdot}C_7,$$

said multiplier comprising:

a first set of gating means for forming the individual digits $S_0$, $S_1$, $S_2$, $S_3$, $S_4$, $S_5$ of a 6-digit binary number $$S = (B_0\ 2{\cdot}B_1)\cdot(A_0 + 2{\cdot}A_1 + 4{\cdot}A_2 + 8{\cdot}A_3) = S_0 + 2{\cdot}S_1 + 4{\cdot}S_2 + 8{\cdot}S_3 + 16{\cdot}S_4 + 32{\cdot}S_,;$$

a second set of gating means for forming the individual digits $T_0$, $T_1$, $T_2$, $T_3$, $T_4$, $T_5$ of a 6-digit binary number $$T = (A_0 + 3{\cdot}A_1 + 4{\cdot}A_2 + 8{\cdot}A_3)\cdot(B_2 + 2{\cdot}B_3) = T_0 + 2{\cdot}T_1 + 4{\cdot}T_2 + 8{\cdot}T_3 + 16{\cdot}T_4 + 32{\cdot}T_5;\ \text{and}$$

a 6 by 4 bit adder for forming the sum of said 6-digit binary number $T$ and a second 4-digit binary number formed from the 4 most significant digits of said 6-digit binary number $S$ to form the 6 most significant digits of said 8-digit number, said adder comprising:

first first-level gating means for forming a first intermediate logical variable $$X_1 = (S_5 \text{ AND } T_3) \text{ OR } ((S_5 \text{ OR } T_3) \text{ AND } (S_4 \text{ AND } T_2));$$

second first-level gating means for forming a second intermediate logical variable $$X_2 = (S_5 \text{ OR } T_3) \text{ AND } (S_4 \text{ OR } T_2);$$

third first-level gating means for forming a third intermediate logical variable $$X_3 = (S_3 \text{ AND } T_1) \text{ OR } ((S_3 \text{ OR } T_1) \text{ AND } S_2 \text{ AND } T_0);$$

first second-level gating means responsive to said $S_4$ and $S_5$ digits and to said $T_2$ and $T_3$ digits as well as to said intermediate variable $X_3$ for forming said digit $C_5$;

second second-level gating means responsive to said intermediate variables $X_1$, $X_2$, and $X_3$ as well as to said variable $T_4$ for forming said output digit $C_6$; and third second-level gating means responsive to said intermediate variables $X_1$, $X_2$, $X_3$ as well as to said $T_4$ and $T_5$ digits for forming said $C_7$ digit;

wherein said $C_0$ is identical to said $S_0$, wherein said $C_1$ is identical to said $S_1$, and wherein said digits $C_2$, $C_3$, $C_4$, $C_5$, $C_6$, and $C_7$ are the outputs of said adder.

2. A logic circuit for use in a 4 by 4 binary multiplier to produce the most significant bit of output therefrom, said circuit being responsive only to five logical variables ($A_3$, $B_3$, $T_4$, $L_1$ and $X_1$) and comprising:

a first level OR gate for forming the logical sum of said variable $X_1$ with the negative of said variable $L_1$;

a first second level AND gate for forming the logical product of the output of said OR gate and said variable $T_4$;

a second second level AND gate for forming the logical product of said variable $T_4$, said variable $B_3$ and said variable $A_3$; and a third level OR gate for forming the logical sum of the output of said first second level AND gate and the output of said second second level AND gate to form said variable $C_7$.

3. An 8 by 8 bit multiplier for forming the product of a first 8-bit binary number $N_1 = C + 16{\cdot}A$ by a second 8-bit binary number $N_2 = D + 16{\cdot}B$, said multiplier comprising:

a first 4 by 4 bit binary multiplier for forming the product $A{\cdot}B$;

a second 4 by 4 bit multiplier for forming the product $C{\cdot}D$;

a third 4 by 4 bit multiplier for forming the product $B{\cdot}C$;

a fourth 4 by 4 bit multiplier for forming the product $A{\cdot}D$;

a first 8 by 8 bit adder responsive to the outputs of said third and fourth multipliers for forming the sum of said outputs as an 8 bit partial product as well as a first carry bit;

a second 8 by 8 bit adder responsive to the four most significant bits output by said second multiplier and to the four least significant bits output from said first multiplier, as well as to said partial product, for forming the 5th through 12th bits of output and a second carry bit; and carry propagate logic means responsive to the four most significant bits of output from said first multiplier as well as to said first and said second carry bits for forming the 13th through 16th output bits.

4. The 8 by 8 bit multiplier of claim 3 wherein said carry propagate logic comprises a plurality of universal logic gates including but a single level of said gates responsive to said second carry bit, the output from any universal logic gate in a given level being independent of the output of any other such gate in said given level, whereby only one additional stage of propagation delay is introduced by said carry propagate logic in addition to those stages of propagation delay already required for the generation of said second carry bit.

5. A 4 by 4 bit multiplier for multiplying a first binary number $$A = A_0 + 2{\cdot}A_1 + 4\ A_2 - 8{\cdot}A_3$$

by a second binary number $$B = B_0 + 2{\cdot}B_1 + 4{\cdot}B_2 - 8{\cdot}B_3$$

to form the 8-digit binary product $$C = C_0 + 2{\cdot}C_1 + 4{\cdot}C_2 + 8{\cdot}C_3 + 16{\cdot}C_4 + 32{\cdot}C_5 + 64C_6 - 128{\cdot}C_7,$$

said multiplier comprising:

a first set of gating means for forming the individual digits of a binary number $$S = (B_0 + 2 \cdot B_1)(A_0 + 2 \cdot A_1 + 4 \cdot A_2 - 8 \cdot A_3) = S_0 + 2 \cdot S_1 + 4 \cdot S_2 + 8 \cdot S_3 + 16 \cdot S_4 - 32 \cdot S_5;$$

a second set of gating means for forming the variable $$T = (B_2 - 2 \cdot B_3)(A_0 + 2 \cdot A_1 + 4 \cdot A_2 - 8 \cdot A_3) = T_0 + 2 \cdot T_1 + 4 \cdot T_2 + 8 \cdot T_3 - 16 \cdot T_5; \text{ and}$$

an adder comprising:

first first-level gating means for forming a first intermediate variable $$X_1 = T_1 \oplus S_3;$$

second first-level gating means for forming a second intermediate variable $$X_2 = (T_1 \text{ AND } S_3) \text{ OR } ((T_1 \text{ OR } S_3) \text{ AND } S_2 \text{ AND } T_0);$$

third first-level gating means for forming an output digit $C_2$ responsive to the $S_2$ and $T_0$ digits of said number $S$ and $T$ respectively;

first second-level gating means responsive to said S digits and to said $T$ digits as well as to said first intermediate variable $X_1$ for forming said digit $C_3$;

second second-level gating means responsive to said S digits and to said $T$ digits as well as to said second intermediate variable $X_2$ for producing said digit $C_4$;

third second-level gating means for forming a third intermediate variable $$X_3 = T_2 (S_4 , T_2 , X_2),$$

the right hand expression signifying a Threshold function True whenever two or more of its arguments are True, said third second-level gating means being responsive to said second intermediate variable $X_2$ as well as to said digits $T_2$ and $S_4$;

fourth second-level gating means for forming a fourth intermediate variable $$X_4 = T_3 \oplus S_5; \text{ and}$$

wired gating means for forming the digit $$C_5 = X_3 \oplus X_4$$

by the suitable cross connection of signals representative of variables $X_3$ and $X_4$ and their complements $\overline{X}_3$ and $\overline{X}_4$.

* * * * *